United States Patent [19]
Ball et al.

[11] Patent Number: 5,601,795
[45] Date of Patent: Feb. 11, 1997

[54] CALOMEL ($HG_2CL_2$) PURIFICATION PROCESS

[75] Inventors: Donald L. Ball, Castlegar; Richard S. Varley, Trail, both of Canada

[73] Assignee: Cominco Ltd., Vancouver, Canada

[21] Appl. No.: 551,038

[22] Filed: Oct. 31, 1995

[51] Int. Cl.$^6$ .............................. C01B 9/00; C01G 13/00
[52] U.S. Cl. ............................................ 423/491; 423/101
[58] Field of Search ...................................... 423/491, 101

[56] References Cited

U.S. PATENT DOCUMENTS

| | | |
|---|---|---|
| 740,855 | 10/1903 | Von Hoessle . |
| 1,809,449 | 6/1931 | Lindsay . |
| 2,570,408 | 10/1951 | Van Gorder et al. . |
| 3,704,103 | 11/1972 | Barta . |
| 3,849,267 | 11/1974 | Hilgen et al. ............................ 423/491 |
| 4,640,751 | 2/1987 | Dyvik et al. ............................ 423/491 |
| 4,729,882 | 3/1988 | Ide et al. ................................. 423/210 |
| 5,013,358 | 5/1991 | Ball et al. ................................ 75/742 |
| 5,071,475 | 12/1991 | Barreau et al. ........................... 75/670 |

FOREIGN PATENT DOCUMENTS

1567520A1   5/1990   U.S.S.R. .

*Primary Examiner*—Steven Box
*Attorney, Agent, or Firm*—Oyen Wiggs Green & Mutala

[57] ABSTRACT

This invention is directed to a novel method for purifying calomel ($Hg_2Cl_2$). More particularly, this invention pertains to a novel process for treating impure calomel ($Hg_2Cl_2$) to produce a highly purified calomel product that passes American Chemical Society requirements for calomel assay and mercuric chloride contamination. A process for treating impure calomel to produce purified calomel comprising: (a) incorporating impure calomel into an aqueous slurry; (b) oxidizing the aqueous slurry with an oxidizing agent to form soluble mercuric chloride; (c) filtering the aqueous slurry containing soluble mercuric chloride into liquid and solid components; (d) heating the liquid component to greater than 70° C; (e) treating the liquid component with a reducing agent to precipitate purified calomel; and (f) separating the precipitated purified calomel from the filtrate.

30 Claims, 1 Drawing Sheet

CALOMEL ($Hg_2Cl_2$) PURIFICATION PROCESS

FIELD OF THE INVENTION

This invention is directed to a novel method for purifying calomel ($Hg_2Cl_2$). More particularly, this invention pertains to a novel process for treating impure calomel ($Hg_2Cl_2$) to produce a highly purified calomel product that passes American Chemical Society requirements for calomel assay and mercuric chloride contamination.

BACKGROUND OF THE INVENTION

In recent years, mankind has realized that elemental mercury is a serious environmental hazard. It has therefore become of increasing concern to many industrial facilities to remove mercury from its waste byproducts, before disposing of them.

Levels of mercury in the concentrate fed to the zinc roasters at the Cominco Ltd. plant in Trail, British Columbia, have been increasing over time due to an increasingly higher mercury content from ore concentrates of the Red Dog and Sullivan mines. This level of mercury results in more than 20 tonnes per year of crude calomel being formed. Since the crude calomel has no market and cannot be disposed of without environmental danger, the continual production of crude calomel leads to a storage space problem. Options for disposing of the crude calomel include building long term storage facilities, or converting the calomel to metallic mercury or upgrading the crude calomel to a marketable calomel that meets American Chemical Society (ACS) standards.

Over the years, a number of processes have been developed to refine mercury or remove it from various mediums.

U.S. Pat. No. 4,640,751, granted Feb. 3, 1987, Dyvik et al., assigned to Boliden AG., discloses a method for the purification of gases containing mercury and simultaneous recovery of the mercury in metallic form by a process where primarily a reaction takes place between metallic mercury vapour and mercury (II)-chloride compounds in solution in a liquid phase. During this process, the formation and deposition of only slightly soluble Hg (I)-chloride (calomel) occurs. The deposited calomel is oxidized to easily soluble Hg (II)-chloride compounds by the addition of chlorine. At least some of the chlorine used is recovered by electrolysis of the formed Hg(II)-chloride.

U.S. Pat. No. 5,013,358, granted May 7, 1991, Donald L. Ball et al., assigned to Cominco Ltd., discloses a method for the recovery of mercury from mercury-containing material. Insoluble mercury salts and any mercury in mercury-containing material are converted into a soluble form by controlled chlorination. The soluble forms of mercury in the chlorination solution are reduced with iron, preferably iron powder, to elemental mercury. After separation from the reduced solution, the solids from the reduction containing entrained mercury, are subjected to a separation step, which separates and substantially quantitatively recovers substantially pure mercury. Separation by elutriation through a body of mercury is preferred. Prior to separation, the reduction solids may be kneaded for coalescence of fine mercury particles, followed by slurrying of the kneaded material. Any selenium in the reduced solution may be recovered in a reduction with a suitable reductant, preferably by adding strong sulfuric acid in the presence of the ferrous chloride formed in the preceding reduction, and excess sulfur dioxide. The process is carried out at ambient conditions, and the amount of liquid in the process is controlled. Substantially no mercury is discharged from the process in residues, or residual liquid. The shortcoming of this process is that elemental mercury is recovered. Elemental mercury is now difficult to sell or to dispose of because of the environmental hazard.

U.S. Pat. No. 4,729,882, granted Mar. 8, 1988, assignee Tokyo-to Kankyo Seibi, discloses a process whereby waste gas containing mercury and a substance containing chlorine are heated and the mercury is changed to soluble mercury chloride ($HgCl_2$). The produced mercury chloride is washed with a washing liquid to fix the mercury as a stable chlorocomplex ion ($HgCl_{4(-2)}$).

U.S. Pat. No. 5,071,475, granted Dec. 10, 1991, Barreau et al., discloses a process and installation for producing mercury by reduction of calomel by implementing a process for preparing metallic mercury. The installation essentially comprises a reaction vessel with an inclined base for the reduction provided with an agitator. The vessel is connected by a conduit to a decanter and provided with water supply means and sulphuric acid supply means. A mercury recovery tank is connected to the lower part of the reaction vessel.

U.S. Pat. No. 3,849,267, granted Nov. 19, 1974, Hilgen et al., discloses a process for recovering mercury from a mercury-containing gas which includes mixing chlorine with the gas. The mixture is then passed through a gas-permeable bed of a non-porous solid material which has a large surface area in relation to the bed volume to collect necessary chloride thereon. The mercury is thereafter recovered by either washing the bed with chlorine containing brine and passing the resulting mercury-containing brine to an electrolysis cell with a mercury cathode, or dissolving the bed material in an aqueous process stream and passing the stream to an electrolysis cell with a mercury cathode.

The following patents disclose subject matter which is of general interest to the area of mercury and calomel technology.

U.S. Pat. No. 740,855, granted Oct. 6, 1903, Von Hoessle, discloses a colloidal calomel product having a dull-white to grey powder quality. The powder contains mercurous chloride ($Hg_2Cl_2$) in a water-soluble form. The product is easily soluble in water to an opalescent liquid and capable of being precipitated from aqueous solution by addition of acid. This patent does not disclose purification of calomel.

U.S. Pat. No. 1,809,449, granted Jun. 9, 1931, Lindsay, describes a white silvery variety of mercurous chloride obtained as a precipitate by reduction of mercuric chloride, in aqueous solution, and in the presence of hydrochloric acid, with an aqueous solution of stannous chloride. This patent also does not describe purification of calomel.

U.S. Pat. No. 2,570,408, Van Gorder, granted Oct. 9, 1951, discloses a process for producing mercurous chloride crystals having a silky nacreous lustre which comprises reacting mercuric chloride with a soluble inorganic dibasic phosphite at a temperature from about 10° to 95° C. in a solution containing from about 1.5 to 7% by weight of the mercuric chloride, soluble, inorganic phosphite and a chloride such as sodium or potassium chloride. The reaction mixture is acidified and the mercurous chloride crystals formed are washed without material loss of lustre. This technology pertains to synthetic pearls.

U.S. Pat. No. 3,704,103, Barta, granted Nov. 28, 1972, discloses a method of preparing single crystals of mercurous halides, which comprises separating the respective mercurous halide from the ambient atmosphere, heating the system to a temperature of at least 120° C. and cooling to the respective crystallization temperature after a specified pressure has been reached. The mercurous halide is gradually cooled to a temperature wherein mercurous halide crystallizes. This patent does not pertain to calomel.

U.S.S.R. Patent SU1567520A1, granted May 30, 1990, Emelyanova, discloses a method for increasing yield and purity of mercury chloride. Metallic mercury is treated by a water solution of hydrogen chloride while passing ozone through the solution. By using ozone, the yield of product is above 99%.

SUMMARY OF THE INVENTION

The invention is directed to a process for treating impure calomel to produce purified calomel comprising: (a) incorporating impure calomel into an aqueous slurry; (b) oxidizing the aqueous slurry with an oxidizing agent to form soluble mercuric chloride; (c) separating the aqueous slurry containing soluble mercuric chloride into liquid and solid components; (d) treating the liquid component with a reducing agent to precipitate purified calomel; and (e) separating the precipitated purified calomel from the liquid component.

The oxidizing agent can be chlorine gas. The reducing agent can be selected from the group consisting of hypophosphorous acid ($H_3PO_2$), hydroxylaminehydrochloride, sulfur dioxide ($SO_2$), orthophosphorous acid ($H_3PO_3$) and ascorbic acid. The preferred reducing agent is hypophosphorous acid ($H_3PO_2$) since its reduced products remain in solution and do not contaminate the final product.

Less than a stoichiometric amount of hypophosphorous acid ($H_3PO_2$) can be added in step (d) so that the mercury in solution is precipitated as calomel. The hypophosphorous acid can be added at a rate which maximizes the degree of reduction and precipitation of calomel and minimizes the formation of metallic mercury. The precipitated calomel can be separated and washed with water, which can be adjusted to a pH of equal to or less than 4.

The liquid component which remains after the calomel is precipitated can be treated with additional reducing agent to remove remaining mercury from the liquid. This additional reducing agent can be hypophosphorous acid ($H_3PO_2$). Solids obtained from treatment with the additional reducing agent can be recycled to the oxidation step (b). The liquid component remaining from the treatment with additional reducing agent can be subjected to an effluent treatment process. The filtrate can be heated to greater than 70° C. Wet purified calomel can be non-aggressively dried to yield calomel of greater than 99.5 wt. % purity.

The invention in a specific embodiment is directed to a process for treating impure calomel to produce purified calomel comprising: (a) incorporating impure calomel into an aqueous slurry; (b) oxidizing the aqueous slurry with chlorine gas to form soluble mercuric chloride; (c) filtering the aqueous slurry containing soluble mercuric chloride into liquid and solid components; (d) heating the liquid component to about or greater than 70° C.; (e) treating the liquid component with hypophosphorous acid ($H_3PO_2$) to precipitate purified calomel; (f) separating the precipitated purified calomel from the liquid component; and (g) washing the purified calomel with water adjusted to a pH of equal to or less than 4.

The washed calomel can be non-aggressively dried. The liquid component from step (e) can be subjected to a second reduction with hypophosphorous acid ($H_3PO_2$) to complete the removal of soluble mercury from solution.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
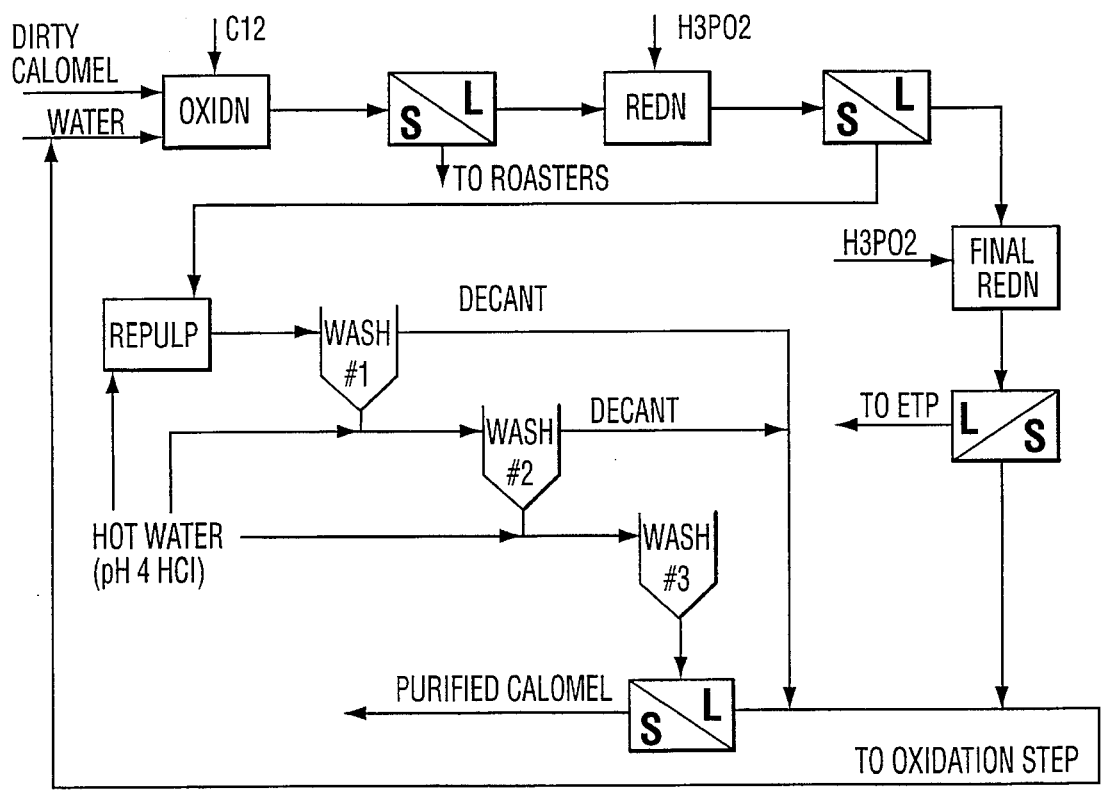
FIG. 1 illustrates a schematic process flow sheet for calomel purification.

Zinc and lead ore concentrates can contain small amounts of mercury which will latolize in roasting and smelting operations. Impure calomel byproduct is produced from metallurgical off-gas cleaning operations. Such gases, containing mercury as vapour, can be treated by the Boliden mercury removal process (U.S. Pat. No. 4,640,751), to produce an impure calomel. However, this impure calomel has no market and must be stored, or further treated.

An initial form of treatment is to oxidize the impure calomel according to the first stage of the process disclosed and claimed in U.S. Pat. No. 5,013,358, Ball et al. In this process, impure calomel is oxidized with chlorine to produce a mercuric chloride solution. However, in that process, the oxidation is followed by reduction to yield elemental mercury, which is undesirable for purposes of this invention.

We have invented a novel process for treating impure calomel, which can be obtained from any number of sources, including the Cominco Ltd. plant, Trail, B.C., Canada, to a highly pure (99.99+%) reagent grade calomel ($Hg_2Cl_2$) that meets two key specifications defined by the American Chemical Society (ACS), namely, a calomel assay and a mercuric contamination maximum limit. The purified calomel obtained from the process of the invention is marketable.

According to the ACS specification, reagent grade calomel must meet the following requirements:

| Assay | $\geq 99.5\%$ $Hg_2Cl_2$ |
|---|---|
| Maximum Allowable | |
| Residue after reduction | 0.02% |
| Mercuric chloride ($HgCl_2$) | 0.01% |
| Sulfate ($SO_4$) | 0.01% |

According to the process of the invention, and referring to the schematic process flow sheet illustrated in FIG. 1, impure calomel is mixed into an aqueous slurry which is reacted with chlorine gas to form soluble mercuric chloride and residual solids. The resultant mixture is filtered and the residue, which contains most of the impurities, is removed and recycled to an existing ore roasting plant. The filtrate is heated to >70° C., and preferably >80° C., and a reducing agent, preferably hypophosphorous acid ($H_3PO_2$), is added to produce high grade calomel. Other alternative reductants can be used, for example, $SO_2$, $H_3PO_3$, ascorbic acid, etc.). Less than a stoichiometric amount of reducing agent is added so that most of the mercury in solution is precipitated as calomel. The reductant is selected on the basis of generating an uncontaminated product (e.g. hypophosphorous acid) and added in such a way that the desired degree of reduction is allowed to occur so that no metallic mercury is formed. The slurry is filtered and the precipitated calomel product is transported to the washing step. The filtrate is reacted with additional reducing agent (preferably hypophosphorous acid ($H_3PO_2$), in order to remove all the remaining mercury from solution. The solids from this second reduction are recycled to the oxidation stage while the filtrate is delivered to an effluent treatment operation. The calomel product is washed in pH adjusted water (warm/hot is preferable for filtration). The final slurry is filtered and the filtrate is recycled to the oxidation stage. The washed solids material from the filtration is wet purified calomel. This wet purified calomel is subjected to a non-aggressive drying step to yield reagent grade calomel of 99.99+% wt. purity.

The process of the invention provides a sound hydrometallurgical approach to producing high purity calomel. Impure/dirty calomel, which is difficult to market, is readily treated to reagent grade and is sold in the marketplace as a useful product. There are minimum environmental hazards involved compared to burning metallic mercury in the presence of chlorine. The process produces a saleable high grade calomel that meets ACS standards. The process also permits mercury from the Cominco Ltd. Trail, B.C. plant to be removed in a responsible manner.

The process of the invention incorporates the following unexpected novel features:

1. Hypophosphorous acid ($H_3PO_2$), which is the preferred reductant, gives a surprising and unexpected double yield. This is explained later in this disclosure in association with reaction equations. High temperatures are required to realize the double yield in the reduction step.
2. $H_3PO_2$ is desirable and preferred because it is not an excessively strong reductant and its oxidized products remain in solution. Therefore, metallic mercury contamination of the product is minimized.
3. The two stages of reduction in the process allow close control of product quality (after the first stage) and effluent quality (after the second stage).
4. Appropriate recycles (see the schematic flow-sheet in FIG. 1) provide high recovery of mercury.
5. The final washing step is novel and enables the purified calomel to meet ACS product specification requirements.

The process of the invention is advantageous for its simplicity and does not require exotic complicated and expensive equipment. The following is a list of the preferred process materials and equipment requirements:

| Reagent Materials | crude calomel ($H_2Cl_2$) |
| --- | --- |
| | $H_2O$ |
| | HCl (Conc) |
| | $Cl_2$ (gas) |
| | $H_3PO_2$ (solution) |
| Equipment | 3 tanks |
| | 2 filter presses |
| | 1 pugger |
| | 1 conical separator |
| Conditions | Reduction @ >70° C.; preferably >80° C. |
| | Washing with pH adjusted water at higher temperatures gives better filterability |

It will be noted in consulting the schematic flowsheet in FIG. 1 that the oxidation and first liquid/solid (L/S) separation step is disclosed in U.S. Pat. No. 5,013,358, the subject matter of which is incorporated herein by reference. The concentration of mercury (Hg) in the liquid phase obtained from the oxidation step after liquid-solid separation is ~40–50 g/L Hg.

For the reduction steps, a hypophosphorous acid ($H_3PO_2$) solution (prepared by using or diluting a 50% solution as desired) is preferably used. This reductant must be added slowly, otherwise metallic mercury can form. This produces an off-colour off-specification calomel product. The reductions are conducted under high agitation at >70° C., and preferably >80° C., to keep the solid materials in suspension and to assist chemical reaction. Typical reaction time is ~½ hour.

Process Limitations

There are some subtle intricacies to the process that must be properly handled in order to enable the process to operate efficiently. A relatively high temperature is required in order to obtain the unexpected double yield effect of the $H_3PO_2$ reducing agent. The pH in the washing step must be carefully controlled. The wet purified calomel must be "non-aggressively" dried in order to prevent formation of metallic mercury or mercuric chloride ($HgCl_2$).

A variety of potential reducing agents, such as ascorbic acid and hydroxylamine hydrochloride have been tested in spot tests as possible alternatives to hypophosphorous acid. However, none of these alternatives demonstrated superior performance to hypophosphorous acid. Therefore, while other suitable reducing agents are conceivable and possible, hypophosphorous acid is preferred.

The following is a description and account of procedures which were investigated in developing the process of the invention and verifying its viability.

A number of tests were performed in order to find a suitable method for producing a pure calomel product that would pass the ACS specifications for calomel assay and mercuric chloride contamination. The investigative testwork was broken down into three sections:

I. $H_3PO_2$ Use
II. Washing
III. Drying

I. $H_3PO_2$ Utilization

This testwork focused on a high temperature (70° C.) reduction step using hypophosphorous acid as the reducing agent. The reduction reaction is shown below.

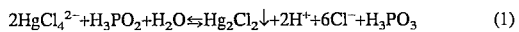

$$2HgCl_4^{2-}+H_3PO_2+H_2O \rightleftharpoons Hg_2Cl_2\downarrow+2H^++6Cl^-+H_3PO_3 \qquad (1)$$

It was found unexpectedly that, at higher temperatures (>>70° C.), the phosphorous acid product of the first reaction ($H_3PO_3$) could be used to reduce the mercuric tetrachloride anion to calomel, thereby halving the reagent consumption. One mole of $H_3PO_2$ should therefore reduce 4 moles of $HgCl_4^{2-}$. The second half of the reaction is shown below.

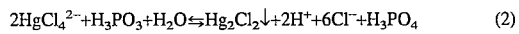

$$2HgCl_4^{2-}+H_3PO_3+H_2O \rightleftharpoons Hg_2Cl_2\downarrow+2H^++6Cl^-+H_3PO_4 \qquad (2)$$

This unexpected phenomenon was proved in the following way. 0.01992 Moles of $H_3PO_2$ was added to a mercuric chloride solution (~0.10 moles Hg) at 85° C. The mass of calomel precipitated was 18.35 g. (0.07774 moles Hg). This resulted in 97.6% utilization of the $H_3PO_2$ based on both reactions taking place. This testwork led to the conclusion that both reactions proceed at high temperatures. They do not take place at lower temperatures. This unique and surprising double utilization allows the operator of the process to either halve the reagent cost of hypophosphorous acid, or use orthophosphorous acid itself at higher temperatures.

II. Washing

After much experimentation, it was established that proper washing of the calomel product was an important critical factor in producing a calomel product that exceeds ACS specification for maximum mercuric chloride concentration (less than 0.01% wt.). To reduce the entrained mercuric chloride concentration to levels below that of ACS specifications (<0.01 wt. %), it was necessary to:

1. Filter the product (cake squeeze and/or air dry recommended);
2. Repulp the product in hot water (~650 L/100 kg calomel), pH adjusted to less than pH 4 with HCl;
3. Decant the supernate;
4. Repeat step 2;
5. Decant the supernate;
6. Repeat step 2;
7. Filter the product (cake squeeze and/or air dry) and wash the cake until it was free from Cl⁻ (This was confirmed by a AgNO₃ test).

It was found that intermediate products, obtained after the first and second wash cycles, failed the ACS test for maximum mercuric chloride concentration. However, after all three wash cycles had been performed, the wet purified calomel product passed the ACS test.

It was also discovered that the characteristics of the wash water impacted on product purity. We established that higher temperature washing improved filtration quality with each successive wash. It also allowed more mercuric chloride to dissolve. We also found that proper pH adjustment of the wash water was imperative. Distilled hot water washes showed no discoloration of the calomel product. However, we found that the use of hot tap water for the second wash produced a greyish calomel sample, indicating contamination, since pure calomel is snow white in colour. This grey discoloration, which is believed to be metallic mercury, was eliminated in two ways. The first method involved cold tap water washes. While this eliminated the discoloration, we found that all the products failed the ACS test for maximum mercuric chloride. We also discovered that the improved filtration qualities inherent in hot water washes were lost. Possible reactions are shown below in the following equations:

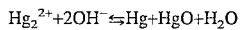

$Hg_2^{2+} + 2OH^- \leftrightarrows Hg + HgO + H_2O$

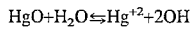

$HgO + H_2O \leftrightarrows Hg^{+2} + 2OH$

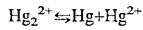

$Hg_2^{2+} \leftrightarrows Hg + Hg^{2+}$ overall

The second method for eliminating the discoloration during washing was to adjust the pH of the hot tap water to less than 4 using HCl. We learned that this method yielded a product which, after 3 washes, passed the ACS test for mercuric chloride maximum. Improved filtration characteristics were also achieved by the hot water wash.

III. Drying

Finally, we learned unpredictably that drying, if not done properly, can cause an otherwise specification passing calomel product to fail the ACS test for either mercuric chloride or calomel assay. We have discovered that if the drying step is too aggressive, the following undesirable reaction can take place:

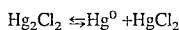

$Hg_2Cl_2 \leftrightarrows Hg^0 + HgCl_2$

We found that one calomel product that was repulped and filtered three times in hot tap water adjusted to pH 2 with HCl failed the ACS test for maximum mercuric chloride concentration after being dried at 90° C. overnight. In that case, the drying was too aggressive. A similar calomel sample that was washed three times by decantation with hot tap water adjusted to pH 3.3 with HCl, passed the ACS test after being non-aggressively dried overnight, in a fume hood, at ambient temperature.

We also confirmed that if the drying step is not conducted efficiently, the residual moisture can cause the product to fail the ACS calomel assay test. One calomel product, with no drying step, was assayed at 99.3% calomel. After overnight drying at 60° C., however, the product assayed 100.0% calomel.

Calomel Product Quality

I. Calomel Assay

For our own purposes, we developed a modified calomel assay procedure. The calomel product produced according to the process of the invention assayed directly for calomel content using a slight variation of the ACS test. We did this because we found that the unmodified ACS test procedure had high titration errors (±0.2%). The new procedure we developed reduced those errors to less than 0.1%. Using our modified procedure, we found that the purified calomel obtained by practising the process of the invention consistently assayed greater than 99.5% calomel, which meets ACS specifications in this regard.

II. Mercuric Chloride

After three decantation wash stages, the product obtained from the process of the invention passed the ACS test for maximum mercuric chloride contamination.

III. Minor Contaminants

By way of comparison, we have found that the purified calomel product obtained by the process of the invention has a lower overall level of minor contaminants than either Fisher or Anachemia reagent grade calomel, which are available on the market. The product of the invention process was substantially lower in silica and iron contamination and slightly lower in several other elements than either Fisher or Anachemia. The product produced by the process of the invention contained slightly more silver and thallium than either of the Fisher or Anachemia reagent grade calomels.

IV. Brightness

Calomel samples produced by the process of the invention were analyzed using a Minolta CR-100 Cromameter. The product was superior with a brightness of 96.90±0.04% compared to 92.1±0.15% and 83.3±0.08% for Fisher and Anachemia respectively.

EXAMPLE 1

In this example, oxidation of dirty calomel was performed. This example illustrates the conversion of calomel and mercury sulfate into mercuric chloride. A number of tests were carried out wherein an amount of the mercury-containing material, containing 74.3% Hg, 0.65% Se, 3.65% Pb, 13.2% Cl and 0.9% S, was slurried in water to a solids content that would give a chlorination solution containing 80 g/L Hg. Excess chlorine was passed through 4 liters of the agitated slurry at an initial rate of 45 g/L.h, while the oxidation reduction potential (ORP) was monitored: a consistent end point was reached in each test. The chlorination solution had an averaged analysis of 76 g/L Hg, 0.71 g/L Se and 0.02 g/L Pb.

It was demonstrated that from 90 to 100% of the mercury in the feed was converted into mercuric chloride, substantially all lead (99%) reported to the chlorination residue, and substantially all selenium (up to 98%) was solubilized. The mercury contained in the residue was in the liquid entrained with the residue and could be substantially removed by washing the residue. The excess chlorine can be significantly reduced (to about 20%) by using a covered reaction vessel and by controlling the rate of addition, for example, by decreasing the rate during chlorination from an initial higher to a subsequent lower value.

EXAMPLE 2

This example illustrates and confirms the unexpected double utilization aspect of the hypophosphorous acid reductant when reduction is carried out at a temperature above 70° C. The reactions are:

$$2HgCl_4^{2-} + H_3PO_2 + H_2O \rightleftharpoons Hg_2Cl_2\downarrow + 2H^+ + 6Cl^- + H_3PO_3 \quad (1)$$

$$2HgCl_4^{2-} + H_3PO_3 + H_2O \rightleftharpoons Hg_2Cl_2\downarrow + 2H^+ + 6Cl^- + H_3PO_4 \quad (2)$$

A. 1.0 liter of 42.5 g/L $Hg^{2+}$ solution (as $HgCl_2$) was reacted at ambient temperature with 5.60 g of 50% w/w $H_3PO_2$ solution which is equivalent to 20.03 g of calomel with single utilization of $H_3PO_2$. The $H_3PO_2$ solution was added slowly under high agitation, for a few hours. The calomel precipitate was carefully filtered. The calomel product weighed 17.35 g and the filtrate assayed 24.6 g/L $Hg^{2+}$ indicating that reaction proceeded according to reaction (1) only, and that double utilization of the $H_3PO_2$ was not realized at ambient temperature.

B. 1.0 liter of 39.9 g/L $Hg^{2+}$ solution (as $HgCl_2$) was reacted at >85° C. with 5.26 g 50% w/w $H_3PO_2$ solution which is equivalent to 37.19 g of calomel with double utilization of $H_3PO_2$. The $H_3PO_2$ solution was added slowly under high agitation for ½ hour. The calomel precipitate was carefully filtered. Calomel product weighed 36.7 g and the filtrate assayed 8.3 g/L $Hg^{2+}$, indicating that the reaction proceeded according to both reactions (1) and (2) and that double utilization of the $H_3PO_2$ was realized at elevated temperatures.

EXAMPLE 3

This example illustrates the temperature dependency of double utilization and metallic mercury contamination of the product with over-reduction.

1.0 liter of 46.7 g/L $Hg^{2+}$ solution (as $HgCl_2$) was reacted at 60° C. with 10.00 g of 50% w/w $H_3PO_2$ solution which is ~130% of stoichiometry including double utilization. The $H_3PO_2$ was added slowly under high agitation for ½ hour. The calomel precipitate was white in colour, indicating that double utilization was not in effect at the temperature of 60° C. Then, the temperature was increased to 75° C. and the calomel product swiftly turned grey, indicating metallic mercury contamination, double utilization and over-reduction.

EXAMPLE 4

This example demonstrates that careful reduction is a requirement of the process. This example confirms that the unacceptable calomel product is made when over-reduction takes place.

1.0 liter of 46.7 g/L $Hg^{2+}$ solution (as $HgCl_2$) was reacted at 70° C. with 10.76 g of 50% w/w $H_3PO_2$ solution which is ~140% of stoichiometry including double utilization. The $H_3PO_2$ solution was added slowly under high agitation, for ½ hour. The calomel precipitate was noticeably grey in colour, indicating over-reduction and metallic mercury contamination.

EXAMPLE 5

This example illustrates the advantages of two stages of reduction with regard to effluent quality and high overall mercury recovery.

0.5 L of 46 g/L $Hg^{2+}$ solution (as $HgCl_2$) was reacted at 70° C. with 4.8 g of 50% w/w $H_3PO_2$ solution which is ~63% of stoichiometry based on single utilization. The $H_3PO_2$ solution was added slowly under high agitation for ½ hour. The calomel precipitate was white in colour and, after filtration, the solution assayed 28 mg/L $Hg^{2+}$, indicating acceptable calomel product quality without metallic mercury contamination but unacceptable effluent. It was noted that, at the 70° C. temperature used, a partial double utilization of the $H_3PO_2$ was achieved.

Upon addition to the filtrate of a further 1.5 g of 50% w/w $H_3PO_2$ solution, a dirty precipitate formed (which would be recycled) and, after filtration, the solution assayed <0.05 mg/L $Hg^{2+}$ indicating very high overall mercury recovery (~100%) and low mercury levels in solution.

EXAMPLE 6

This example demonstrates the need to wash the purified calomel in order to meet ACS mercuric ($Hg^{2+}$) assay specifications.

Dirty calomel was oxidized with chlorine gas to give a mercuric chloride solution after liquid/solid separation. Wet calomel product was then prepared from the solution by reduction with hypophosphorous acid added at less than stoichiometry (~90%) at double utilization. The $H_3PO_2$ solution was added slowly under high agitation for ½ hour at 85°–90° C.

A sample of unwashed calomel product was analyzed for mercuric ($Hg^{2+}$) contamination and did not meet specification. The calomel was then washed with hot (~80° C.) pH adjusted (pH 3.3) water by repulping for ½ hour followed by decantation. Three repulp washes were performed and the calomel was sampled between washing stages. Samples after the first and second repulp did not meet the mercuric specification; whereas the sample after the third repulp did meet specification.

EXAMPLE 7

Washed calomel product, prepared in a similar fashion as previously described, was assayed for total calomel content as described in the ACS specification. The specification requires >99.5% calomel. The product assayed as follows:

| Sample | Calomel Assay |
| --- | --- |
| 1 | 99.8 |
| 2 | 100.1 |
| 3 | 99.8 |
| 4 | 99.8 |
| 5 | 99.9 |
| 6 | 99.8 |
|  | 99.9 avg. |

The product met specification in all tests. In further testing, calomel product produced was compared to Fisher and Anachemia reagent grade calomel for calomel assay. See Table 1 for data. Table 1 illustrates in tabular form comparative calomel assays for calomel product obtained from Fisher and Anachemia, compared to the calomel product produced according to the subject invention. The product of the invention compares favourably with reagent grade material.

TABLE 1

CALOMEL ASSAYS

| Samples | Fisher Calomel | Anachemia Calomel | Cominco Product |
|---|---|---|---|
| 1 | 99.7 | 99.9 | 100.2 |
| 2 | 99.9 | 99.7 | 100.3 |
| 3 | 99.7 | 99.7 | 100.2 |
| 4 | 99.9 | 99.7 | 100.3 |
| 5 | 100.3 | 100.2 | 99.8 |
| 6 | 99.7 | *101.2 | 100.1 |
| 7 | 99.3 | 100.3 | 99.8 |
| 8 | 100.3 | 100.7 | 99.8 |
| 9 | 100.1 | 100.2 | 99.9 |
| 10 | 100.2 | *103.1 | 99.8 |
| 11 | 100.4 | | |
| 12 | 100.0 | | |
| 13 | 100.2 | | |
| 14 | 100.0 | | |
| 15 | 99.9 | | |
| Average | 100.0 | 100.1 | 100.0 |

*Not included for average calculation

A sample of calomel product produced from the above-described test was submitted for semi-quantitative analysis (SQS by Jeco method) and the results were compared with crude (i.e. dirty) calomel and also Fisher and Anachemia reagent grade calomel. The results are shown in Table 2 below. Overall product quality of the calomel produced according to the invention surpasses both Fisher and Anachemia.

EXAMPLE 8

This example demonstrates the effectiveness of other reductants for production of calomel from mercuric chloride solution. The following reductants were used to reduce mercuric ($Hg^{2+}$) in solution to calomel.

Reductant hydroxylamine hydrochloride ascorbic acid orthophosphorous acid

In all cases, the presence of calomel only in the product was confirmed by x-ray diffraction (XRD). Further testwork with sulphur dioxide also indicated its usefulness as a reductant.

Table 2 illustrates in tabular form comparative trace metal contaminants in calomel products obtained from Fisher, Anachemia and crude calomel product prior to treatment prior to the subject process, and purified calomel product obtained after treatment by the subject invention.

TABLE 2

Calomel Assays by Jeco SQS

| | Fisher Calomel | Anachemia Calomel | Cominco Crude Calomel | Cominco Purified Calomel |
|---|---|---|---|---|
| Ag | 0.3 | 0.1 | 10 | 4 |
| Al | 0.7 | 4 | 20 | 0.2 |
| B | <0.3 | <0.3 | 7 | <0.3 |
| Ba | <0.7 | <0.7 | 3 | <0.7 |
| Bi | <0.2 | <0.2 | 0.3 | <0.2 |
| Ca | 1 | 4 | 15 | 0.2 |
| Cd | <0.7 | <0.7 | 2 | <0.7 |
| Cr | 2 | <0.3 | 1 | <0.3 |
| Cu | 1 | 0.1 | 10 | 0.2 |
| Fe | 40 | 10 | 20 | 0.7 |
| Mg | 0.7 | 4 | 7 | 0.4 |
| Mn | 2 | 0.2 | 2 | <0.1 |
| Na | <5 | <5 | 100 | <5 |
| Ni | 2 | <0.2 | 2 | <0.2 |
| Pb | 2 | <0.1 | 300 | <0.1 |
| Sb | <1 | <1 | 3 | <1 |
| Si | 20 | 30 | 30 | 1 |
| Sn | <0.1 | <0.1 | 1 | <0.1 |
| Ti | <2 | <2 | 30 | <2 |
| Tl | <0.3 | <0.3 | 30 | 2 |
| Zn | <10 | <10 | 100 | <10 |

All Assays are in ppm

Table 3 illustrates in tabulated form comparative brightness testing results of reagent grade calomel samples obtained in the marketplace from Fisher and Anachemia and compared to the reagent grade calomel product that is obtained according to the subject invention.

TABLE 3

Brightness testing results of Calomel Samples

| No. | Fisher | Anachemia | Cominco Product |
|---|---|---|---|
| 1 | 92.0 | 83.1 | 96.9 |
| 2 | 92.0 | 83.3 | 96.9 |
| 3 | 91.9 | 83.4 | 96.8 |
| 4 | 92.0 | 83.4 | 96.8 |
| 5 | 92.0 | 83.3 | 96.9 |
| 6 | 92.0 | 83.3 | 96.9 |
| 7 | 92.0 | 83.3 | 96.8 |
| 8 | 92.0 | 83.4 | 96.8 |
| 9 | 92.0 | 83.3 | 96.9 |
| 10 | 92.1 | 83.3 | 96.9 |
| 11 | 92.0 | 83.3 | 96.9 |
| 12 | 91.9 | 83.3 | 96.9 |
| 13 | 92.0 | 83.3 | 96.9 |
| 14 | 91.9 | 83.3 | 96.9 |
| 15 | 91.9 | 83.4 | 96.9 |
| 16 | 92.1 | 83.4 | 96.9 |
| 17 | 92.1 | 83.3 | 96.9 |
| 18 | 92.2 | 83.4 | 96.9 |
| 19 | 92.3 | 83.4 | 96.9 |
| 20 | 92.2 | 83.4 | 96.9 |
| 21 | 92.3 | 83.4 | 96.9 |
| 22 | 92.3 | 83.4 | 96.9 |
| 23 | 92.3 | 83.2 | 96.9 |
| 24 | 92.3 | 83.3 | 96.9 |
| 25 | 92.3 | 83.2 | 97.0 |
| Avg | 92.1 | 83.3 | 96.9 |
| Std. Dev. | 0.146 | 0.0779 | 0.0440 |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for treating impure calomel to produce purified calomel comprising:

(a) incorporating impure calomel into an aqueous slurry;

(b) oxidizing the aqueous slurry with an oxidizing agent to form soluble mercuric chloride;

(c) separating the aqueous slurry containing the soluble mercuric chloride into liquid and solid components;

(d) contacting the liquid component with a reducing agent to precipitate purified calomel; and (e) separating the precipitated purified calomel from the liquid component.

2. A process as claimed in claim 1 wherein the precipitated purified calomel is washed with water.

3. A process as claimed in claim 1 wherein the purified calomel product is non-aggressively dried.

4. A process as claimed in claim 1 wherein the washed purified calomel product is non-aggressively dried.

5. A process as claimed in claim 1 wherein the liquid component of step (c) is heated to greater than 70° C.

6. A process as claimed in claim 1 wherein the oxidizing agent is chlorine gas.

7. A process as claimed in claim 1 wherein the reducing agent is selected from the group consisting of hypophosphorous acid ($H_3PO_2$), sulfur dioxide ($SO_2$), orthophosphorous acid ($H_3PO_3$), ascorbic acid, and hydroxylamine-hydrochloride.

8. A process as claimed in claim 1 wherein the reducing agent is hypophosphorous acid ($H_3PO_2$).

9. A process as claimed in claim 8 wherein less than a stoichiometric amount of hypophosphorous acid ($H_3PO_2$) is added in step (d) so that the mercury in solution is precipitated as calomel.

10. A process as claimed in claim 8 wherein the hypophosphorous acid is added at a rate which maximizes the degree of reduction and precipitation of calomel and minimizes the formation of metallic mercury.

11. A process as claimed in claim 2 wherein supernate of the washed separated precipitated calomel of step (e) is decanted and the resultant calomel is washed a second time with water.

12. A process as claimed in claim 1 wherein the separated precipitated calomel of step (e) is washed with water adjusted to a pH of equal to or less than 4.

13. A process as claimed in claim 2 wherein supernate of the washed separated precipitated calomel of step (e) is decanted and the resultant calomel is washed a second time with water, and subsequently a third time with water.

14. A process as claimed in claim 13 wherein the separated precipitated calomel is washed each time with water adjusted to a pH of equal to or less than 4.

15. A process as claimed in claim 1 wherein liquid component remaining after the calomel is precipitated is treated with additional reducing agent to precipitate remaining mercury from the liquid component.

16. A process as claimed in claim 15 wherein the additional reducing agent is hypophosphorous acid ($H_3PO_2$).

17. A process as claimed in claim 16 wherein solids obtained from treatment with additional reducing agent are recycled to an oxidation step (b).

18. A process as claimed in claim 15 wherein liquid component from the treatment with additional reducing agent is transported to an effluent treatment process.

19. A process as claimed in claim 15 wherein calomel precipitate from the additional reducing agent step is recycled.

20. A process as claimed in claim 13 wherein wet purified calomel is non-aggressively dried to yield calomel of greater than 99.5 wt. % purity.

21. A process as claimed in claim 14 wherein wet purified calomel is non-aggressively dried to yield calomel of greater than 99.5 wt. % purity.

22. A process for treating impure calomel to produce purified calomel comprising:

(a) incorporating impure calomel into an aqueous slurry;

(b) oxidizing the aqueous slurry with chlorine to form soluble mercuric chloride;

(c) filtering the aqueous slurry containing soluble mercuric chloride into liquid and solid components;

(d) heating the liquid component to about or greater than 70° C.;

(e) reducing the liquid component with hypophosphorous acid ($H_3PO_2$) to precipitate purified calomel;

(f) separating the precipitated purified calomel from the liquid component;

(g) washing the separated purified calomel with water;

(h) non-aggressively drying the washed calomel;

(i) reducing the liquid component from step (f) with a second reduction with hypophosphorous acid ($H_3PO_2$) to precipitate remaining mercury from the liquid component; and (j) separating the precipitate of step (i) from the liquid component.

23. A process as claimed in claim 22 wherein the wash water is of a pH of less than or equal to 4.

24. A process as claimed in claim 22 wherein supernate of the washed separated precipitated calomel of step (g) is decanted and the resultant calomel is washed a second time with water.

25. A process as claimed in claim 24 wherein the separated precipitated calomel of step (g) is washed with water adjusted to a pH of equal to or less than 4.

26. A process as claimed in claim 22 wherein supernate of the washed separated precipitated calomel of step (g) is decanted and the resultant calomel is washed a second time with water, and subsequently a third time with water.

27. A process as claimed in claim 26 wherein the separated precipitated calomel is washed each time with water adjusted to a pH of equal to or less than 4.

28. A process as claimed in claim 25 wherein wet purified calomel is non-aggressively dried to yield calomel of greater than 99.5 wt. % purity.

29. A process as claimed in claim 26 wherein wet purified calomel is non-aggressively dried to yield calomel of greater than 99.5 wt. % purity.

30. A process as claimed in claim 27 wherein wet purified calomel is non-aggressively dried to yield calomel of greater than 99.5 wt. % purity.

* * * * *